United States Patent [19]

Bishop et al.

[11] 3,935,471
[45] Jan. 27, 1976

[54] CURRENT LIMITING POWER SUPPLY

[75] Inventors: Marion M. Bishop, Seattle; Walter Robert Weist, Bellevue, both of Wash.

[73] Assignee: The Boeing Company, Seattle, Wash.

[22] Filed: Jan. 15, 1975

[21] Appl. No.: 541,263

[52] U.S. Cl. .................. 307/32; 307/88; 323/56
[51] Int. Cl.² .......................................... H02J 3/00
[58] Field of Search .......... 323/51, 44 R, 6; 307/30, 307/31, 32, 17, 11, 15, 16, 12, 13, 14, 88 R

[56] References Cited
UNITED STATES PATENTS

| | | | |
|---|---|---|---|
| 698,156 | 4/1902 | Thomson | 307/17 |
| 2,800,625 | 7/1957 | Geroulo et al. | 323/56 |
| 3,384,884 | 5/1968 | Var | 323/51 |

Primary Examiner—James R. Scott
Assistant Examiner—M. Ginsburg
Attorney, Agent, or Firm—Brown, Murray, Flick & Peckham

[57] ABSTRACT

A power supply for a control system in which a plurality of loads in the form of transducers, sensors and the like are employed. The loads are isolated from each other, the system being such that any load can be shorted without affecting operation of any other load circuit and without damage to the power source components. This is achieved with the use of a saturating transformer and a series inductor in the respective load circuits which isolate each circuit from the others while at the same time providing for excellent voltage regulation in the overall system.

4 Claims, 3 Drawing Figures

U.S. Patent   Jan. 27, 1976   3,935,471
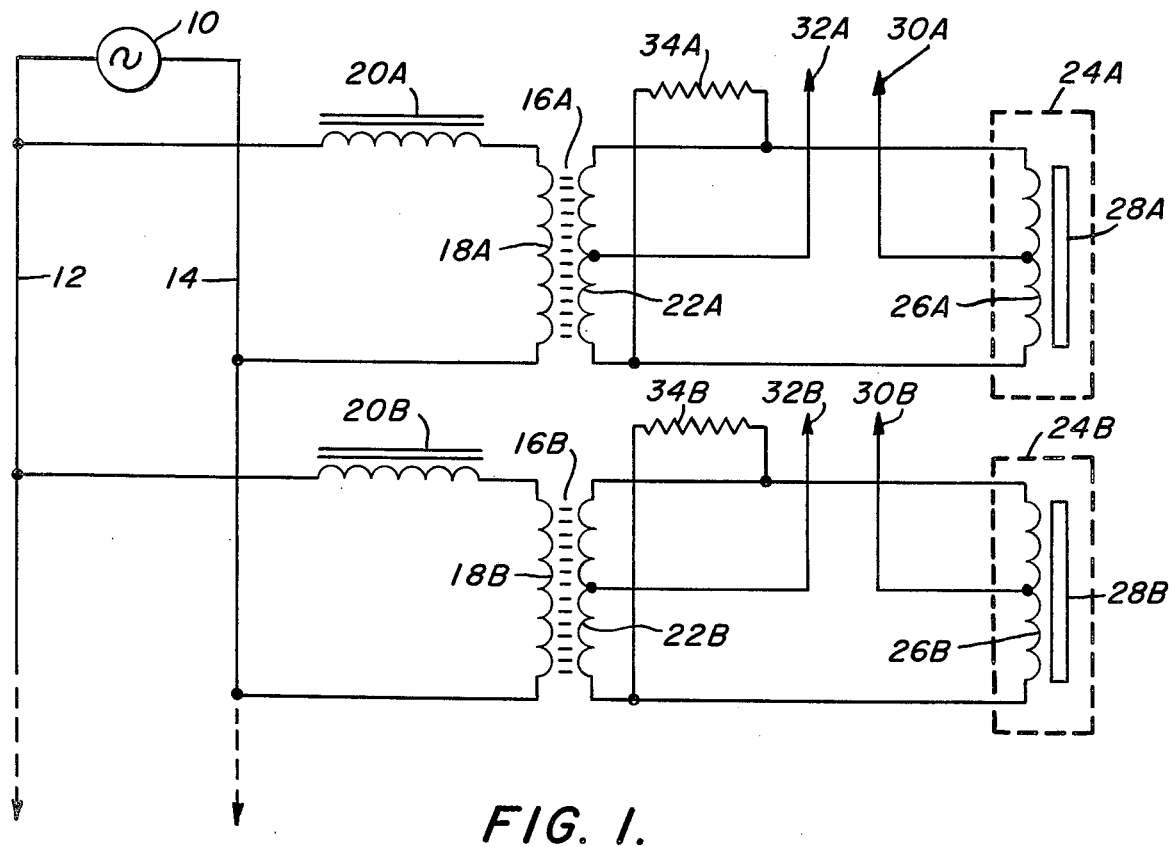
FIG. 1.
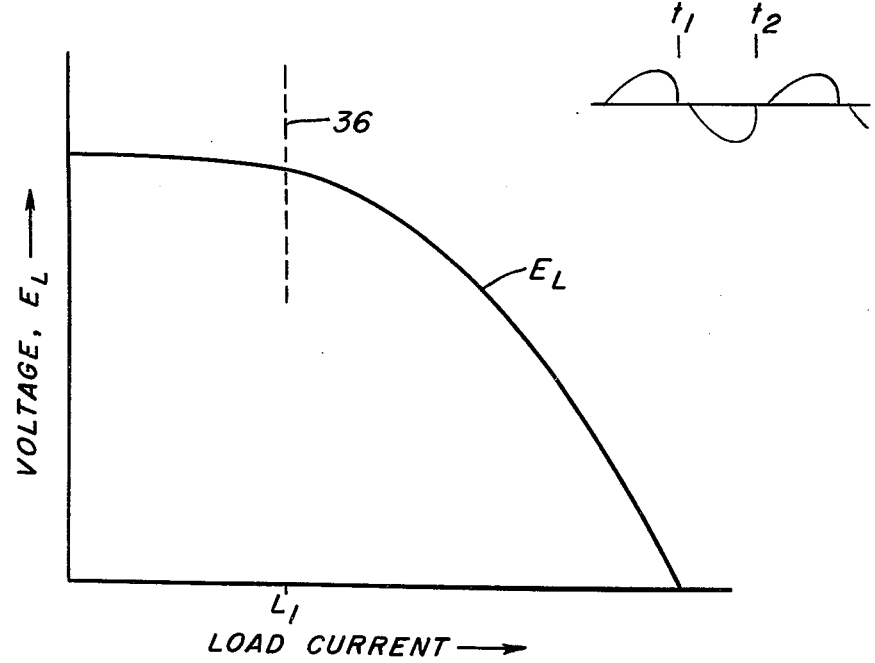
FIG. 2.
FIG. 3.

CURRENT LIMITING POWER SUPPLY

BACKGROUND OF THE INVENTION

While not limited thereto, the present invention is particularly adapted for use in a power supply for control systems such as those used on hydrofoil seacraft, aircraft and the like where safety is a paramount consideration. In a hydrofoil craft, for example, reliability is vitally important in the roll control system. Such a roll control system comprises sensing means for sensing motion of the craft about the roll axis and means responsive to the signals generated by the sensing means to effect the desired movement of the control surfaces on the foils of the craft to counteract the rolling motion and stabilize the craft about its roll axis. In case of a failure or malfunction in this roll control system, an unsafe condition can develop in which the motion of the craft becomes unstable; and the craft can exhibit divergent motions such that it may impact the water with angular rates of motion and attitudes that can endanger personnel on board the craft or cause possible damage to the craft itself.

In a control system of the type described above, the power supply utilized must supply many loads isolated from each other. At the same time, these loads must be capable of being momentarily or continuously shorted followed by a rapid recovery to normal operation after the short is removed. Additionally, a short on any circuit must not affect operation of any other circuit.

In the past, the problem of load isolation in a system of this type has been attacked by providing a series inductor for each load requiring excitation. This provides current limiting and isolation but introduces poor voltage regulation. Other techniques for accomplishing the same result ultilize complicated electronic regulators; however these are not altogether satisfactory and are expensive.

SUMMARY OF THE INVENTION

In accordance with the present invention, load isolation in a power supply system for a control network is provided which utilizes a saturable transformer and a series inductor for each load. This provides for current limiting and isolation and at the same time effects excellent voltage regulation.

Specifically, there is provided in accordance with the invention a power supply system for a plurality of loads comprising (1) a source of alternating current voltage, (2) separate transformers equal in number to the number of loads connecting the source of alternating current voltage to the respective loads, (3) primary and secondary windings for each of the transformers, (4) an inductor connecting each primary winding in series with the source of alternating current voltage, (5) a load comprising a sensing device connected across the secondary winding, and (6) cores of saturable magnetic material in the respective, separate transformers. In this manner, a short in any load circuit and the resultant surge in current will cause its associated saturable transformer to saturate. The core of the transformer will remain saturated until the short is removed, whereupon normal operation will immediately commence. The saturable transformers isolate the respective loads one from the other and at the same time are such that the voltage across the power leads connected to the respective loads does not vary materially, even though one or more loads are shorted.

The above and other objects and features of the invention will become apparent from the following detailed description taken in connection with the accompanying drawings which form a part of this specification, and in which:

FIG. 1 is a schematic circuit diagram of the power supply system of the invention as applied to a pair of position transducers;

FIG. 2 illustrates the wave shape (typical) of the voltage appearing across the secondary windings of the saturable transformers of FIG. 1; and FIG. 3 is a plot of load current versus voltage across the secondary windings of the transformers of FIG. 1.

With reference now to the drawings, and particularly to FIG. 1, the power supply system shown includes a source of alternating current voltage 10 connected through power leads 12 and 14 to a plurality of load circuits, only two of which are shown in FIG. 1 and identified by the letters A and B. Both of the load circuits are identical and, accordingly, only one will be described in detail.

Each load circuit includes a saturable core transformer 16A or 16B having a primary winding 18A or 18B connected to the power leads 12 and 14 through a series inductor 20A or 20B. The secondary winding 22A or 22B is connected to a load 24A or 24B which, in the embodiment of the invention shown, comprises a position transducer having an inductive winding 26A or 26B magnetically coupled to a movable core 28A or 28B. A center tap on the winding 26A, for example, is connected to one input lead 30A; while a center tap on the secondary winding 22A is connected to a second output lead 32A. A resistor 34A or 34B is connected in shunt with the secondary winding 22A or 22B for the purpose of limiting current and adjusting the operating level of the circuit. Each resistor may be adjustable if desired.

With the arrangement shown, movement of the core 28A or 28B from its central or null position will unbalance the bridge circuit shown, thereby producing an output across leads 32A and 30A (in the case of circuit A) which is proportional to the movement of the core 28A above or below its central, null position. It will be understood, however, that the position transducers shown are only one type of transducer which may be employed.

With an arrangement such as that shown in FIG. 1, and assuming that a short occurs across the secondary winding 22A, the current will rapidly rise in the secondary winding, causing the core 16A to saturate. As is well known, a saturable core transformer, such as that shown in FIG. 1, employs a core of square-loop hysteresis material which presents a sharp cutoff point between conditions of saturation and unsaturation. When the core is saturated, there can be no change of flux. Consequently, the voltage across the secondary winding 22A drops essentially to zero. This isolates the shorted load from the remainder of the power supply system. However, if the short should be only momentary or of short duration, as soon as it is removed current in the secondary winding 22A will fall and the transformer will no longer be saturated, thereby restoring normal operation.

A typical waveform across the secondary winding 22A is shown in FIG. 2. The first portion of the waveform, comprising the positive half of a sine wave, proceeds until time $t_1$, whereupon the transformer saturates and the voltage drops to zero. The negative half of the sine wave is the same with the voltage dropping to zero when the core 16A saturates at time $t_2$. The time at which the core saturates will depend, of course, upon the amplitude of the applied alternating current voltage. The greater the applied voltage, the shorter will be the time between the initiation of a half cycle and the time at which the transformer saturates. Of course, if a short should occur, the voltage across the secondary winding will be zero and, in effect, no waveform will appear.

The voltage-current characteristics across the secondary winding 22A, for example, are shown in FIG. 3. It will be noted that until the load current increases above a predetermined value $L_1$, the voltage remains substantially constant; and this will be true across all loads. However, if a short should occur, then the voltage $E_L$ will drop, but not abruptly. As can be seen, the system provides for excellent voltage regulation characteristics. Line 36 represents the nominal transformer secondary load, typically about 1 volt-ampere.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. A power supply system in combination with a plurality of loads comprising a source of alternating current voltage, separate transformers equal in number to the number of loads connecting said source of alternating current voltage to the respective loads, primary and secondary windings for each of said transformers, inductors connected in series with the respective each primary windings across said source of alternating current voltage, each of said loads comprising a sensing device connected across each of said secondary windings, and cores of saturable magnetic material inductively coupled to the respective primary and secondary windings.

2. The combination of claim 1 wherein said sensing device comprises a position transducer having a movable core inductively coupled to an inductor connected across said secondary winding of each transformer, and means connecting center taps on said last-mentioned inductor and said secondary winding to output terminals across which appears a voltage indicative of the position of said movable core with respect to said last-mentioned inductor.

3. The combination of claim 1 including a resistor connected in shunt with the secondary winding of each transformer.

4. The combination of claim 1 wherein the series combinations of said first-named inductors and said primary windings for all loads are connected in parallel across said source of alternating current voltage.

* * * * *